Patented Dec. 8, 1953

2,662,102

UNITED STATES PATENT OFFICE 2,662,102

PREPARATION OF CYCLOHEXENE

Gerald M. Whitman, New Castle, Del., assignor to E. I. du Pont de Nemours & Company, Wilmington, Del., a corporation of Delaware No Drawing. Application March 29, 1950, Serial No. 152,757

3 Claims. (Cl. 260—666)

This invention relates to the preparation of cyclohexene and, more particularly, to a process of preparing cyclohexene in better yields than heretofore.

As shown in Joshel U. S. Patents 2,349,173 and 2,349,232, it is known that cyclohexene may be prepared by reacting butadiene-1,3 with ethylene. However, despite the use of high pressure and elevated temperature, Joshel was able to obtain only an 18% yield of cyclohexene, according to the article by Joshel and Butz—J. Am. Chem. Soc. vol. 63, page 3350. It is suggested in that article that optimum conditions of time, temperature, and pressure and, also, the use of an anti-polymerization agent may be useful in promoting higher yields by retarding undesirable side reactions. Yields of cyclohexene substantially in excess of 30%, or so, have heretofore been unobtainable using Joshel's ratio of one mole of butadiene-1,3 to 1.35 moles of ethylene, even when the yield calculations are based on 100% butadiene recovery.

An object of the present invention is to provide a simple and economical process of preparing cyclohexene from butadiene-1,3 and ethylene. A further object is to provide such a process wherein yields of 60% and better of cyclohexene based on 100% recovery of the butadiene-1,3 may be obtained. Other objects will be apparent from the description of the invention given hereinafter.

The above objects are accomplished according to the present invention by reacting ethylene with butadiene-1,3 in the proportion of at least 10 moles of ethylene to one mole of butadiene-1,3 at a temperature of about 100° C. to 300° C. and under a pressure of at least 100 atmospheres.

In a preferred method for carrying out the present invention one mole of butadiene-1,3 is heated in a closed reactor of 400 cc. capacity with at least 10 moles of ethylene at a temperature in the range of 100° C.–300° C. and at a pressure of 100 to 2000 atmospheres. Throughout the period of reaction the pressure within the reactor is maintained by periodically repressuring with ethylene. After reaction is complete, as evidenced by cessation of pressure drop, the reactor is cooled to below 0° C., bled of excess ethylene, and the contents discharged. The reaction product is isolated by distillation or other methods known to the art.

The present invention resides in large part in the discovery that the yield of cyclohexene in this reaction is unexpectedly increased by using at least 10 moles of ethylene per mole of butadiene-1,3 and that this is a far more influential factor in the reaction than adjustments of time, temperature, and pressure which Joshel had believed would tend to increase the yield. The effect of increasing the mole ratio of ethylene is to favor the production of cyclohexene at the expense of the competing reaction which leads to the formation of 4-vinylcyclohexene-1.

The following examples in which all parts are in grams unless otherwise stated, were all carried out in a 400 cc. reactor and illustrate specific embodiments of the invention.

Example I

A pressure reactor is evacuated, cooled to −50° C., and 25 parts of butadiene-1,3 is charged into it. The reactor is then placed on a shaking assembly and pressured with ethylene to 100 atmospheres, after which the temperature and pressure are increased simultaneously to 165° C. and 900 atmospheres, respectively, over a period of about 75 minutes. These conditions are maintained for a period of 18 hours, during which time ethylene is periodically injected into the reactor to maintain the pressure at the indicated level. After there is no further pressure drop, the reactor is cooled to −70° C., the residual ethylene pressure is released slowly, and the liquid product is discharged. By fractional distillation the product is separated into 78% of cyclohexene, boiling point 80° C.–83° C., $n_D^{30}$ 1.4406, and 18.5% of 4-vinylcyclohexene-1, boiling point 120° C.–128° C., $n_D^{31.5}$ 1.4592. The mole ratio of ethylene to butadiene-1,3 in this example is 20:1.

Example II

A pressure reactor is evacuated, cooled to −50° C., and a mixture of 26 parts of butadiene-1,3 and 135 parts of ethylene distilled into it. The reactor is placed on a shaking machine and the reactor heated to 165° C. During a period of reaction of 17 hours and 30 minutes at 165° C. the pressure within the reactor is maintained at 900 atmospheres by periodically repressuring with ethylene. At the end of this period of reaction, the reactor is cooled to −70° C., the residual ethylene pressure is released slowly, and the liquid product is discharged. Fractional distillation of the product shows it to consist of 76.4% cyclohexene, boiling point 82° C.–83° C., $n_D^{25}$ 1.4431 and 19.8% 4-vinylcyclohexene, boiling point 120° C.–128° C., $n_D^{25}$ 1.4608. The mole ratio of ethylene to butadiene-1,3 in this example is again 20:1.

Example III

A pressure reactor is evacuated, cooled in a Dry Ice-acetone mixture, and a mixture of 27 parts of butadiene-1,3 and 170 parts of ethylene charged into it. The mole ratio of ethylene to butadiene is 12.2:1. The reactor is heated to 200° C., pressure and temperature recording being thereafter taken as follows:

| Time | Temperature, °C. | Pressure, Atm. |
|---|---|---|
| 11:30 | 148 | 760 |
| 11:45 | 171 | 830 |
| 12:00 | 185 | 850 |
| 12:15 | 196 | 855 |
| 12:30 | 200 | 850 |
| 1:00 | 200 | 830 |
| 1:30 | 201 | 810 |
| 2:00 | 200 | 800 |
| 8:30 | 200 | 800 |

At the end of the heating period the reactor is cooled to room temperature and the gases vented slowly through two traps connected in series and cooled in Dry Ice-acetone mixture. The condensate which is collected in the traps is added to the liquid product. The crude product amounts to 25.1 g. Cyclohexene is separated by fractional distillation through an efficient column, the quantity of cyclohexene present in intermediate cuts being estimated from refractive index measurements. A total of 18.3 g. of cyclohexene and 6.8 g. of vinyl cyclohexene is obtained. On the basis of 100% butadiene recovery these are respectively, yields of 63.9% and 36.1% of theory.

It will be understood that the above examples are merely illustrative and that the invention comprises preparing cyclohexene by reacting ethylene with butadiene-1,3 in the proportion of at least 10 moles of ethylene to one mole of butadiene-1,3, at a temperature of about 100° C. to 300° C. and under a pressure of at least 100 atmospheres.

The temperature at which the reaction is carried out, may be varied considerably but should not be so high as to have a destructive effect upon the cyclohexene formed. Temperatures within the approximate range of 100° C. to 300° C. have been found satisfactory.

The pressure at which the reaction is carried out, should be at least 100 atmospheres and generally will be in the range of 100 to 2000 atmospheres. However, higher pressures may be used since the upper pressure is only limited by the physical limitations of the equipment employed.

The ethylene used should be of good quality. As a rule, ethylene containing less than 1000 parts/million of oxygen and, preferably, less than 200 parts/million of oxygen should be used.

The mole ratio of ethylene to butadiene-1,3 is critical and forms an essential feature of this invention. It has been discovered that the yield of cyclohexene increases rapidly as the proportion of ethylene is increased and that, if a proportion of at least 10 moles of ethylene per mole of butadiene-1,3 is employed, yields upwards of about 60% cyclohexene, on the basis of 100% butadiene-1,3 recovery, are readily attainable. As shown in Examples I and II, yields above 75% were obtained when the specifically preferred mole ratio of 20:1 was employed. Higher mole ratios of ethylene may be used with further increase in yields but, even though the ethylene may be recycled, there ordinarily is no marked overall advantage in using a mole ratio much in excess of 20:1 and mole ratios down to 10:1 are quite practical. Yields greatly in excess of those obtained by Joshel are possible using mole ratios of even less than 10:1 but substantial advantage of the instant invention is not taken unless a mole ratio of ethylene to butadiene-1,3 of at least 10:1 is used.

If desired, a lower mole ratio of ethylene to butadiene-1,3 may be used in the starting reaction mixture and then the mole ratio increased to the range of this invention by injecting ethylene into the reactor as the reaction proceeds in order that yields in the neighborhood of 60% and above of cyclohexene may be obtained.

Although the examples have illustrated the batchwise operation of the process, it is to be understood that it may also be carried out as a vapor liquid phase semi-continuous or continuous operation. If desired, inert solvents may be employed and for this purpose the aliphatic and aromatic hydrocarbons are suitable.

The present invention provides a highly advantageous and economical method for the preparation in high yield of cyclohexene which is an important intermediate for the synthesis of adipic acid and of other nylon intermediates.

This application is a continuation-in-part of applicant's copending application Serial No. 653,949, filed March 12, 1946, now abandoned.

As many apparently widely different embodiments of this invention may be made without departing from the spirit and scope thereof, it is to be understood that the invention is not limited to the specific embodiments thereof except as defined in the appended claims.

The invention claimed is:

1. A process of preparing cyclohexene which comprises reacting ethylene with butadiene-1,3 in the proportion of at least 10 moles of ethylene to 1 mole of butadiene-1,3, at a temperature of about 100° C. to 300° C. and under a pressure of at least 100 atmospheres.

2. Process as set forth in claim 1 wherein the mole proportion of ethylene to butadiene-1,3 is approximately 20:1.

3. The process as set forth in claim 2 wherein the pressure is 100 atmospheres to 2000 atmospheres.

GERALD M. WHITMAN.

References Cited in the file of this patent

UNITED STATES PATENTS

| Number | Name | Date |
|---|---|---|
| 2,002,394 | Frey | May 21, 1935 |
| 2,112,847 | Ipatieff et al. | Apr. 5, 1938 |
| 2,181,640 | Deanesly et al. | Nov. 28, 1939 |
| 2,290,211 | Schaad | July 21, 1942 |
| 2,349,173 | Joshel | May 16, 1944 |
| 2,349,232 | Joshel | May 16, 1944 |
| 2,430,137 | Oblad et al. | Nov. 4, 1947 |
| 2,473,472 | Gorin et al. | June 14, 1949 |

OTHER REFERENCES

Bachman et al., J. Am. Chem. Soc., vol. 60, page 481 (1938).

Joshel and Butz, J. Am. Chem. Soc., vol. 63, page 3350 (1941).